*INVENTOR.*
CONRADIN O. KREUTZER

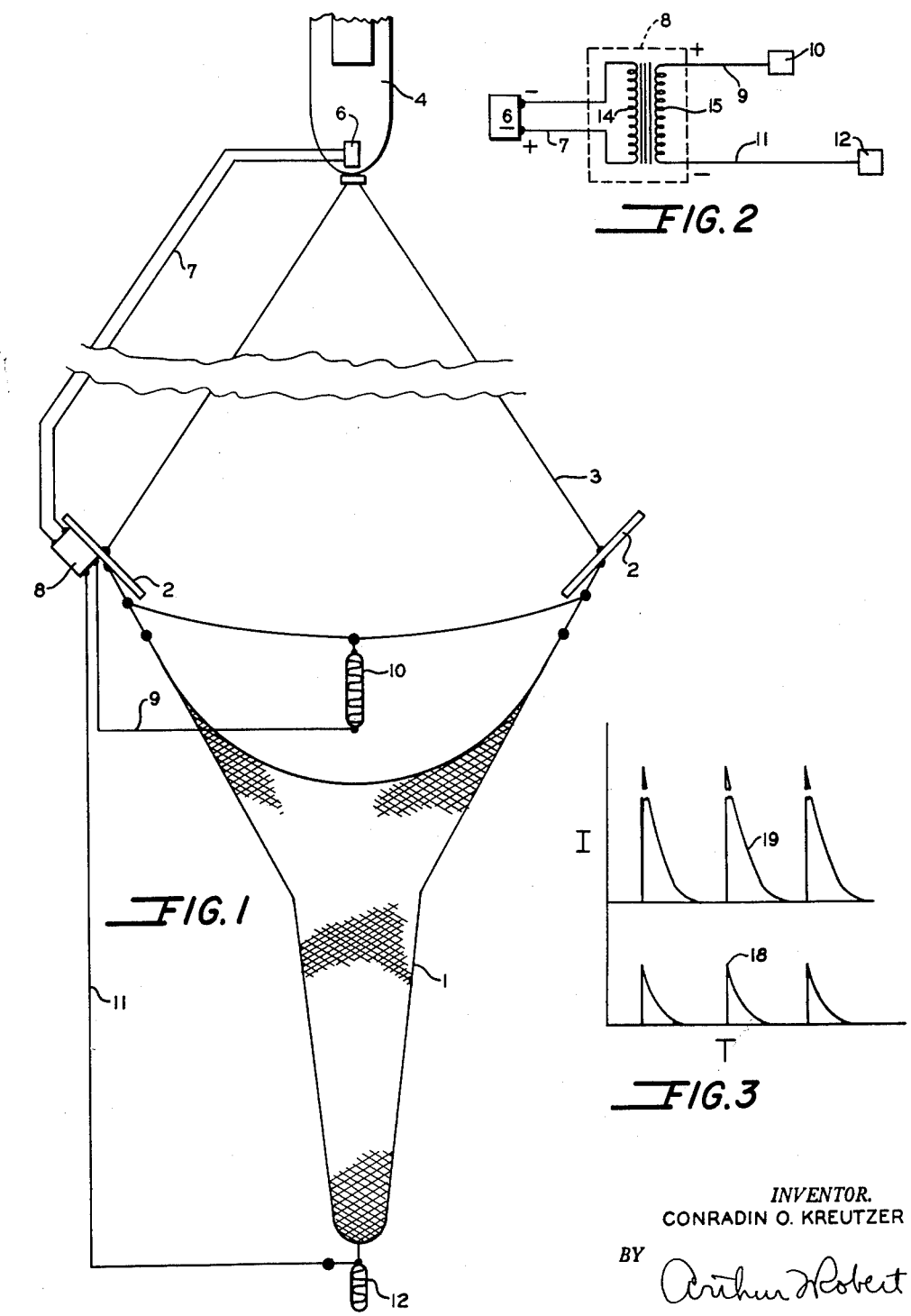

BY

ATTORNEY

United States Patent Office 3,110,978
Patented Nov. 19, 1963

3,110,978
METHOD OF AND APPARATUS FOR ELECTRIFYING TRAWL NET FISHING WATERS WITH IMPULSE CURRENT
Conradin Otto Kreutzer, Lewes, Del., assignor to Smith Research and Development Company, Inc., Lewes, Del., a corporation of Delaware
Filed May 24, 1962, Ser. No. 197,414
3 Claims. (Cl. 43—4.5)

This invention relates to the art of electrically influencing living creatures and includes, among other things, the electro-fencing art wherein fish are "electrically" repelled from a given area by means of a bipolar current, i.e. by "electrifying" that area with an electrical current of alternately changing polarity such as sustained A.C. or impulse A.C., and the electro-fishing art wherein fish are "electrically" attracted toward an anode in a given area by "electrifying" that area with a unipolar current, i.e. an electrical current of unchanging polarity such as sustained D.C. or impulse D.C.

More particularly this invention relates to a method of and an apparatus for electrifying the fishing waters of a trawl net with impulse current; hence, it is hereinafter explained in connection with the electrification of the "frontal waters" of a trawl net, i.e. the waters adjacent to and in front of the mouth of the net.

It has heretofore been sought to "electrify" the waters immediately in front of a forwardly moving submerged trawl net during the trawling operation for the purpose of causing the fish in such waters either to swim into the net or to be stunned within reach of the net, that is to say stunned at locations where they can be harvested by the net before they sink or float out of the reach of the net. To accomplish this objective, it has been proposed to mount appropriate electro-fishing electrodes on the submerged trawl net equipment and energize such electrodes with electro-fishing current impulses which are generated on the boat and then transmitted to the electrodes through long cables, e.g. 300 to 3,000 feet more or less. It is however difficult to transmit these current pulses through long cables without deleteriously changing their shape and without suffering large voltage and power losses.

To avoid these difficulties, it has been suggested that the impulse generating equipment be located under water in the immediate vicinity of the net and supplied from the boat with either sustained direct current or commercial alternating current. While this suggested method avoids distortion of the impulses and keeps power losses low, it is subject to the difficulties involved in submerging and moving a large and complicated electrical impulse generating unit with the net. Furthermore, if the generating equipment utilizes ignitrons, which contain liquid mercury, or equivalent switches, the suggested method involves the additional difficulty of maintaining the generating equipment in a constantly level position; otherwise such switches will not operate properly.

The principal object of the present invention is to provide a simple and highly practical solution for the problems involved in electrifying remote areas with D.C. impulses of the electro-fishing type.

Another important object of this invention is to provide a simple and inexpensive method of and means for electrifying the frontal waters of the submerged forwardly moving trawl net with electro-fishing impulses without deleteriously affecting the shape of the impulses and without suffering large power losses.

Another important object is to accomplish the foregoing objectives with an arrangement which does not require the use of large and complicated apparatus mounted on or in the vicinity of the net but which requires only a small compact simple apparatus which may be readily mounted on the otter boards commonly used with the net or on special otter boards or equivalent apparatus.

The objects of my invention are attained by generating high voltage low amperage D.C. impulses of the electro-fishing type on a boat, transmitting such impulses through appropriate cable to a remote area in the immediate vicinity of the trawl net, transforming the high voltage low amperage impulses at the remote area into relative low voltage high amperage D.C. impulses and then feeding the transformed impulses to electrodes which are appropriately located with respect to the net. With my arrangement, it is an easy matter to generate high voltage low amperage D.C. impulses of a shape appropriate for electrically influencing living creatures, particularly water creatures such as fish. Such impulses can be transmitted through long cables without undergoing much deleterious change in shape and without suffering a substantial power loss. In the remote area, they can be easily transformed into low voltage high amperage direct current impulses of the electro-fishing type by means of a direct current impulse transformer of the electro-fishing type. This transformation can be accomplished without any appreciable change in shape or power loss. When transformed, it is a simple matter to conduct them to appropriately located electrodes. As a consequence, my arrangement avoids the prior art difficulties heretofore noted.

The invention is illustrated in the accompanying drawings wherein:

FIG. 1 is a schematic top plan view of a conventional trawling apparatus equipped with an electro-fishing system constructed in accordance with my invention;

FIG. 2 is a circuit diagram of the electro-fishing system of FIG. 1;

Figure 4:
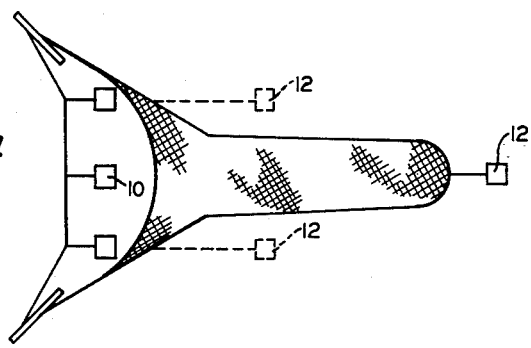
Figure 5:
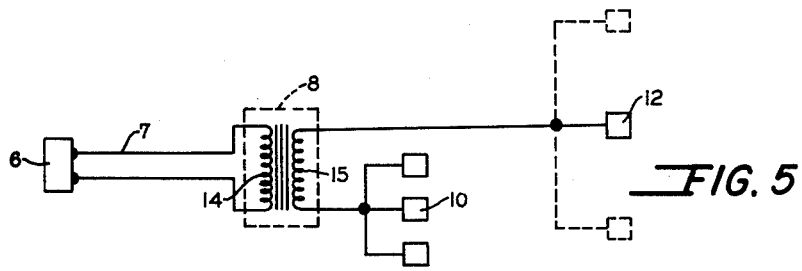
Figure 6:
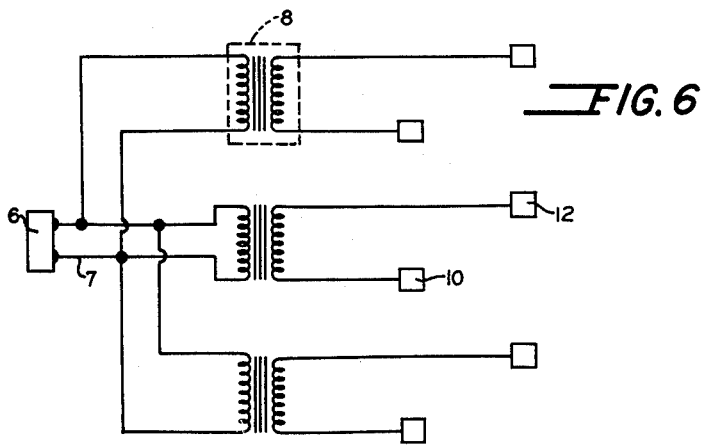
Figure 7:
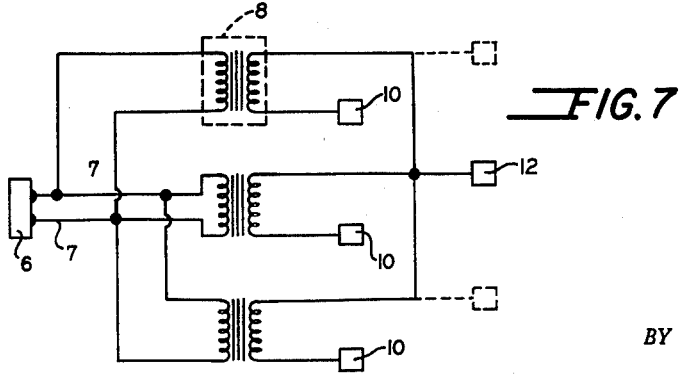

FIG. 3 graphically illustrates the wave forms of the primary impulses generated on the boat and delivered to the impulse transformer and of the transformed or secondary impulses coming from the impulse transformer;

FIG. 4 is a schematic plan view of a trawl net using a modified electrode arrangement; and FIGS. 5–7 are circuit diagrams of various electrical layouts which may be used with the electrode arrangement of FIG. 4.

In the arrangement shown in FIG. 1, a submergible trawl net assembly, conventionally composed of a net 1 and otter boards 2, is connected through two tow lines 3 to a trawler 4. The boat 4 carries a D.C. impulse generator 6, which is designed to generate high-voltage low-amperage D.C. impulses of the electro-fishing type.

In accordance with my invention, these high-voltage impulses are conducted, by suitable high voltage transmission lines 7, to the vicinity of the remotely located trawl net assembly and there transformed into relatively low-voltage high-amperage D.C. impulses by a D.C. impulse transformer 8, which delivers them to the electrifying circuit means. Accordingly, the transformer 8 is connected by the wire 9 to the anode electrode 10 and by the wire 11 to the cathode electrode 12.

The impulse transformer 8 is encased in a waterproof casing and mounted on the rear or outer face of one of the otter boards 2, which hold the net 1 open. This is simply one convenient way of mounting the transformer 8 near the trawl net 1 and there may be other mounting arrangements for it which may be better or at least equally suitable. For example, it may be possible to hang it on the bottom edge of the net mouth so that it can serve as one of the weights conventionally used on this portion of the net for cooperating with the otter boards 2 in holding the net mouth open.

The anode 10 is shown as located in the frontal waters of the net 1, i.e. the waters at and immediately in front of the mouth of the net. In this location, it electrifies the frontal waters and is effective over an area determined by the power used. The cathode 12 is shown trailing from the cod end of the net 1 where it is sufficiently remote from the front area of the net to avoid creating any fish repelling influence in the forward path of the net.

The direct current impulse generator 6 preferably generates spaced direct current impulses having the characteristics of a capacitor charging or discharging surge of current. A suitable generator of this type is disclosed in my U.S. Patent No. 2,836,735, issued May 27, 1958.

The electrical circuit used in the arrangement of FIG. 1 is shown in FIG. 2. It will be seen that the impulse generator 6 is connected through the transmission lines 7 to the primary winding 14 of the impulse transformer 8 and that the secondary winding 15 of the impulse transformer 8 is connected by wires 9 and 11, respectively, to the anode 10 and cathode 12. In connecting the transformer 8 into the circuit, care should be taken to connect the plus side of the secondary 15 to the anode 10 and its minus side to the cathode 12, particularly keeping in mind that the current induced in the secondary 15 by the current in the primary 14 is reversed in polarity.

In one operative example of the apparatus, the generator 6 generates a primary impulse having a peak voltage of 4200 volts and a peak current of 1750 amps. The wires 7 connecting the generator 6 with the transformer 8 may be in the form of two conductors concentrically-arranged in an insulated cable of appropriate length, say 400 feet more or less. Both conductors may be of the size 1/0 A.W.G. The voltage step-down impulse transformer 8 is assumed to have a 6:1 ratio; hence the secondary winding 15 in this example will theoretically have a peak voltage of 700 volts and a peak current of 10,500 amps.

The current impulses appearing in the primary and secondary windings 14 and 15 are illustrated in FIG. 3, plotted against the horizontal coordinate of time. The lower current wave 18 represents the low-current impulses flowing in the primary winding 14 while the upper current wave 19 represents the high-current impulses flowing in the secondary winding 15.

Table I illustrates how the transmission efficiency rises and the power loss falls as the peak voltage of the generated impulse and the magnitude of the (step-down) ratio of the impulse transformer are both increased in a manner providing a secondary impulse peak voltage, which, in the absence of transmission losses, has a constant value of say 700 volts. The power losses shown in this table are those caused solely by the transmission cable 7 and do not include any losses taking place in the transformer 8. These values were measured when delivering a constant input power value of 50 kw. from the generator on the boat to the input end of a cable having two 1/0 A.W.G. conductors.

*Table I*

| Transformer Voltage Step-down Ratio | 1:1 | 5:1 | 8:1 |
|---|---|---|---|
| Peak Impulse Voltage Generated On Boat | 700 | 3,500 | 5,600 |
| Peak Impulse Voltage Transmission Efficiency With: | | | |
| (a) 500′ cable | 41% | 95 | 98 |
| (b) 1,000′ cable | 26% | 90 | 96 |
| Peak Impulse Voltage Delivered by Transformer With: | | | |
| (a) 500′ cable | 287 | 665 | 686 |
| (b) 1,000′ cable | 182 | 630 | 672 |
| Voltage Loss With: | | | |
| (a) 500′ cable | 413 | 35 | 14 |
| (b) 1,000′ cable | 518 | 70 | 28 |

The size of the field, created about the anode 10, effective to attract fish is dependent primarily on the amount of current or current density flowing in the water. Practical considerations limit the effectiveness of this electric field to the near vicinity of the anode 10. One way of enlarging the field is to use multiple anodes, as shown in FIGS. 4 and 5, wherein three anodes 10 are spaced across the mouth of the net 1. These multiple anode arrangements may be used with a single cathode 12, as shown in solid lines in FIGS. 4 and 5 or with multiple cathodes 12 as shown in dotted lines in FIGS. 4 and 5.

It may be desirable to use several impulse transformers 8 as indicated in FIG. 6 wherein three separate transformers are used with their primary windings 14 connected in parallel with each other across the transmission cable 7 and with the secondary windings 15 of each transformer connected to its own separate anode 10 and cathode 12. FIG. 7 shows the same circuit as FIG. 6 except that, as shown in solid lines, one cathode 12 is connected to all anodes. As an alternative FIG. 7 arrangement, two additional cathodes 12, shown in dotted lines, may be connected to the first mentioned cathode 12 of FIG. 7. As a further alternative arrangement, the plurality of transformers 8 shown in FIGS. 6 and 7 can have their primary windings 14 connected in series across the transmission cable 7.

It should also be understood that D.C. impulse transformers for electro-influencing purposes, such as electro-fishing, are quite similar to impulse transformers used in radar equipment. In such impulse transformers, the distortionless transformation of a D.C. pulse requires the inductance-over-resistance time constant ("opposing" the rapid buildup of a disturbing magnetic field in the transformer) to be large and the corresponding time constant ("opposing" the rapid rise of secondary current) to be small. The main inductivity should be so large that the magnetizing current is less than $\frac{1}{10}$ the primary current while the leakage inductivity should be so small that the secondary pulse has the same shape as the primary pulse. (See Fisher's 1958 Leipzig edition of "Radartechnik"; also Reuben Lee's "Electronic Transformers and Circuits" published by John Wiley & Sons in 1947.) In this connection, it may be noted that radar impulse transformers are smaller than my impulse transformers because radar transformers are designed for microsecond impulses whereas my transformers are designed for millisecond impulses. Impulse transformers suitable for this purpose are reasonably small and compact. For example, the dimensions of a suitable 50 kw. transformer may approximate 10″ x 10″ x 5″.

The shape of each impulse to be fed to a D.C. impulse transformer preferably should be an "e" function having a half value time of 0.3 millisecond, this being the regular shape of a pulse created by discharging a condenser through an ohmic resistor. However, any D.C. impulse of the electro-fishing type may be used in practicing the present invention. The secondary or low-voltage impulse discharged by the impulse transformer will normally have substantially the same shape as the primary impulse applied to it, the difference between these impulses being one of size or value rather than shape.

By "D.C. impulse of the electro-fishing type," I mean a direct current of the spaced impulse type disclosed (or of the type usable in electro-fishing apparatus for operation of the character disclosed) in prior U.S. patents on electro-fishing subjects matter. Among these are: #2,764,832 dated October 2, 1956; #2,792,659 dated May 21, 1957; #2,836,735 dated May 27, 1958; #2,850,832 dated September 9, 1958; and #2,850,833 dated September 9, 1958.

By "impulse transformer of the electro-fishing type," I mean an impulse transformer which, following the principles governing the design of radar impulse transformers, is designed for use with D.C. millisecond impulses of the electro-fishing type instead of microsecond impulses.

This application is a continuation-in-part of my presently copending application S.N. 89,549 filed February 15, 1961, now abandoned, for Apparatus for and Method of Electrically Influencing Living Creatures in Remote Areas.

I have successfully designed, built and used (in trawling operations) 2:1 voltage step-down D.C. electro-fishing impulse transformers (for converting D.C. impulses having a peak voltage of 1400 volts and a peak current of 1750 amps. into D.C. electro-fishing impulses having a peak voltage of 700 volts and a peak current of 3500 amps.) and I have published their specifications. (See "Electro-Trawling In Shallow Sea Water" copyright 1962 by Smith Research and Development Co., Inc. Copies available in U.S. Library of Congress, Canadian and U.S. Patent Office and Lewes, Delaware Public Library.) Three such 2:1 electro-fishing impulse transformers may be used in the operative example heretofore given to transform a generated impulse having a peak voltage of 4200 volts and a peak current of 1750 amps. into an electro-fishing impulse having a peak voltage of 700 volts and a peak current of 10,500 amps., simply by connecting the primaries of said three transformers in series and their secondaries in parallel. In this way, the three transformers cooperate to provide a 6:1 voltage step-down from the generated voltage of 4200 volts to the operative secondary voltage of 700 volts.

Having described my invention, I claim:
1. An improvement in trawl fishing methods of the type wherein electro-fishing electrodes are operatively mounted on the submerged trawl net fishing assembly in the vicinity of the net and energized with spaced high-current D.C. impulses of the electro-fishing type which are generated in a generating station on an unsubmerged surface boat and transmitted to the submerged electrodes through elongate cables, comprising:
   (a) generating said impulses in the form of high-voltage impulses;
   (b) transmitting them as high-voltage impulses to the vicinity of the submerged net;
   (c) transforming them in the vicinity of the submerged net into relative low-voltage high-current impulses; and
   (d) energizing said submerged electrodes with said transformed low-voltage impulses.
2. An apparatus for conducting an electrified trawling operation from a trawler, comprising:
   (a) boat carried means for generating spaced high-voltage D.C. impulses of the electro-fishing type;
   (b) a submergible trawl net assembly adapted to be towed by the trawler at a desired submerged level, said assembly including a pair of electro-fishing electrodes which, when the assembly is submerged, are operatively associated with the trawl net;
   (c) a D.C. electro-fishing impulse transformer mounted on the trawl net assembly, said transformer having primary and secondary voltage step-down windings;
   (d) transmission line means connecting said generator to said primary winding to energize said transformer with said high-voltage D.C. impulses; and
   (e) means connecting said secondary winding to energize said electrodes with D.C. electrode-fishing impulses having a substantially lower voltage and higher current than the impulses flowing in said primary winding.
3. An improvement in trawl fishing apparatus of the type wherein electro-fishing electrodes are operatively mounted on a submerged trawl net fishing assembly in the vicinity of the net and energized with spaced high-current D.C. impulses of the electro-fishing type which are generated in a generating station on an unsubmerged surface and transmitted to the submerged electrodes through elongate cables, comprising:
   (a) means for generating said impulses in the form of high-voltage impulses;
   (b) means for transmitting them as high-voltage impulses to the vicinity of the submerged net;
   (c) means for transforming them in the vicinity of the submerged net into relative low-voltage high-current impulses; and
   (d) means for energizing said submerged electrodes with said transformed low-voltage impulses.

References Cited in the file of this patent
UNITED STATES PATENTS

| | | |
|---|---|---|
| 2,745,205 | Kafka | May 15, 1956 |
| 2,836,735 | Krentzer | May 27, 1958 |

OTHER REFERENCES

R. Lee: "Electronic Transformers and Circuits," published 1947 by John Wiley and Sons. Pages 219–232.